(12) United States Patent
She et al.

(10) Patent No.: US 10,822,281 B2
(45) Date of Patent: Nov. 3, 2020

(54) ACCELERATED CVI DENSIFICATION OF CMC THROUGH INFILTRATION

(71) Applicant: United Technologies Corporation, Farmington, CT (US)

(72) Inventors: Ying She, East Hartford, CT (US); James T. Beals, West Hartford, CT (US); Xia Tang, West Hartford, CT (US); Richard Wesley Jackson, Groton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 54 days.

(21) Appl. No.: 16/185,203

(22) Filed: Nov. 9, 2018

(65) Prior Publication Data

US 2020/0148600 A1  May 14, 2020

(51) Int. Cl.
| | | |
|---|---|---|
| *C04B 35/628* | (2006.01) |
| *C23C 16/32* | (2006.01) |
| *C04B 35/80* | (2006.01) |
| *C04B 35/626* | (2006.01) |
| *C04B 35/638* | (2006.01) |

(52) U.S. Cl.
CPC ...... *C04B 35/806* (2013.01); *C04B 35/62655* (2013.01); *C04B 35/62834* (2013.01); *C04B 35/62863* (2013.01); *C04B 35/62884* (2013.01); *C04B 35/62894* (2013.01); *C04B 35/638* (2013.01); *C04B 2235/3826* (2013.01); *C04B 2235/604* (2013.01); *C04B 2235/606* (2013.01); *C04B 2235/614* (2013.01)

(58) Field of Classification Search
CPC ............ C04B 35/806; C04B 35/62655; C04B 35/62834; C04B 35/62863; C04B 35/62884; C23C 16/325
See application file for complete search history.

(56) References Cited

U.S. PATENT DOCUMENTS

| | | | |
|---|---|---|---|
| 6,723,382 B2 | 4/2004 | Yamaguchi et al. | |
| 6,921,058 B2* | 7/2005 | Becker | B60N 3/16 248/370 |

(Continued)

FOREIGN PATENT DOCUMENTS

CN       102964139 A       3/2013

OTHER PUBLICATIONS

Golecki, I., "Rapid vapor-phase densification of refractory composites". Materials Science and Engineering, R20 (1997) 37-124.*

(Continued)

*Primary Examiner* — Bret P Chen
(74) *Attorney, Agent, or Firm* — Bachman & LaPointe, P.C.

(57) ABSTRACT

A process for densification of a ceramic matrix composite comprises forming a reinforcing ceramic continuous fiber stack having a central zone bounded by an outer zone adjacent; locating first particles within the central zone; coating the first particles and the ceramic fibers with silicon carbide through chemical vapor infiltration; locating second particles within the outer zone; coating the second particles and the ceramic fibers with silicon carbide through chemical vapor infiltration; forming the stack into a predetermined three dimensional shape; and densifying the stack.

19 Claims, 3 Drawing Sheets

(56) References Cited

U.S. PATENT DOCUMENTS

| | | | |
|---|---|---|---|
| 2003/0044593 A1* | 3/2003 | Vaidyanathan | B29C 70/382 428/297.4 |
| 2009/0238966 A1* | 9/2009 | La Forest | C04B 35/83 427/228 |
| 2010/0003504 A1* | 1/2010 | Louchet-Pouillerie | C04B 41/009 428/334 |
| 2011/0071013 A1* | 3/2011 | Newton | C04B 35/5622 501/95.2 |
| 2011/0150663 A1* | 6/2011 | Manicke | C04B 35/573 416/241 B |
| 2013/0108417 A1* | 5/2013 | Renon | B29B 11/16 415/173.1 |
| 2016/0175960 A1 | 6/2016 | Harris | |
| 2017/0002466 A1* | 1/2017 | Delperier | F27D 99/0001 |
| 2017/0029340 A1 | 2/2017 | Weaver et al. | |
| 2018/0187560 A1 | 7/2018 | Harris et al. | |
| 2018/0257996 A1* | 9/2018 | Dambrine | C04B 35/83 |

OTHER PUBLICATIONS

Elzey, D.M., et al., "Modeling the Densification of Metal Matrix Composite Monotape". Acta metall. mater., vol. 41, No. 8, pp. 2297-2316, 1993.*

Maillé, Laurence, et al., "Ceramic matrix composites manufactured by multistep densification of Si—O—C fibre preform." Ceramic Transactions, 2014, 244, pp. 61-69.*

Bertrand, S., et al., "The Thermal Gradient-Pulse Flow CVI Process: a New Chemical Vapor Infiltration Technique for the Densification of Fibre Preforms". Journal of the European Ceramic Society 18 (1998) 857-870.*

Prewo, K.M., et al., "Silicon carbide yarn. reinforced glass matrix composites". Journal of Materials Science 17 (1982) 1201-1206.*

NASA Factsheet "Silicon Carbide (SiC) Fiber-Reinforced SiC Matrix Composites". NP-2015-04-1517-HQ. 2 pages. No date or citation available.*

David, Patrick G., et al., "Rapid Densification of Carbon and Ceramic Matrix Composites Materials by Film Boiling Process". 16th International Conference on Composite Materials, pp. 1-5. No date or citation available.*

European Search Report dated Mar. 10, 2020 issued for corresponding European Patent Application No. 19208329.3.

* cited by examiner

ACCELERATED CVI DENSIFICATION OF CMC THROUGH INFILTRATION

BACKGROUND

The disclosure relates to a ceramic matrix composite densification process. Particularly, the process combines a slurry application and a chemical vapor infiltration (CVI) process in which particles are deposited to enhance vapor phase deposition within an interior of a fiber preform to densify the ceramic matrix composite.

Gas turbine engine components are exposed to high temperature environments with an increasing demand for even higher temperatures. Economic and environmental concerns relating to the reduction of emissions and the increase of efficiency are driving the demand for higher gas turbine operating temperatures. In order to meet these demands, temperature capability of the components in hot sections such as blades, vanes, blade tracks, seal segments and combustor liners may be increased.

Ceramic matrix composites (CMCs) may be a candidate for inclusion in the hot sections where higher gas turbine engine operating temperatures are required. One benefit of CMC engine components is the high-temperature mechanical, physical, and chemical properties of the CMCs which allow the gas turbine engines to operate at higher temperatures than current engines.

One possible method of manufacturing dense CMC bodies may include infiltration of a fiber preform. The method may involve the infiltration of silicon carbide (SiC) particulate filled slurry.

SUMMARY

In accordance with the present disclosure, there is provided a process for densification of a ceramic matrix composite comprising: forming a reinforcing ceramic continuous fiber stack having a central zone bounded by a middle zone and an outer zone adjacent the middle zone opposite the central zone; locating small particles within the central zone; coating the small particles and the ceramic fibers with silicon carbide through chemical vapor infiltration; locating medium particles within the middle zone; coating the medium particles and the ceramic fibers with silicon carbide through chemical vapor infiltration; locating large particles within the outer zone; and coating the large particles and the ceramic fibers with silicon carbide through chemical vapor infiltration; forming the stack into a predetermined three dimensional shape; and densifying the stack.

In another and alternative embodiment, the reinforcing ceramic continuous fiber stack comprises fiber tows aligned into plies, each fiber tow having a surface having pores.

In another and alternative embodiment, the step of locating small particles within the central zone further comprises coating the surface of the fiber tow proximate the central zone with a slurry containing the small particles.

In another and alternative embodiment, the step of locating medium particles within the middle zone further comprises coating the surface of the fiber tow proximate the middle zone with a slurry containing the medium particles.

In another and alternative embodiment, the step of locating large particles within the outer zone further comprises coating the surface of the fiber tow proximate the outer zone with a slurry containing the large particles.

In another and alternative embodiment, the step of forming the stack into a predetermined three dimensional shape comprises placing the stack into a tool having a predetermined shape mold.

In another and alternative embodiment, the step of forming the stack into a predetermined three dimensional shape comprises pressing the stack in the tool into the predetermined shape.

In another and alternative embodiment, the step of densifying the stack comprises utilizing the chemical vapor infiltration to coat surfaces of the small, medium and large particles and coat surfaces of the fiber tows; and heating the stack.

In another and alternative embodiment, the process further comprises prior to locating the small, medium and large particles, pre-coating the tows aligned into the stack of plies by employing an interface fiber coating; and rigidizing the stack.

In another and alternative embodiment, the process further comprises infiltrating the small particles into the pores of the plies by using a binder; removing the binder having the small particles from the middle zone and the outer zone.

In another and alternative embodiment, the process further comprises infiltrating the medium particles into the pores of the stack proximate the middle zone and the outer zone by using a binder; removing the medium particles from the outer zone.

In another and alternative embodiment, the process further comprises infiltrating the large particles into the pores of the plies proximate the outer zone by using a binder.

In another and alternative embodiment, removing the small particles and the medium particles comprises soaking the stack in a solvent for a predetermined time to dissolve the binder from the middle and outer zones respectively.

In accordance with the present disclosure, there is provided a process for densification of a ceramic matrix composite comprising forming a reinforcing ceramic continuous fiber stack having a central zone bounded by an outer zone adjacent; locating first particles within the central zone; coating the first particles and the ceramic fibers with silicon carbide through chemical vapor infiltration; locating second particles within the outer zone; coating the second particles and the ceramic fibers with silicon carbide through chemical vapor infiltration; forming the stack into a predetermined three dimensional shape; and densifying the stack.

In another and alternative embodiment, the process further comprises coating a first slurry containing the first particles onto a surface of first plies that form the stack, such that the first particles infiltrate into pores of the first plies; coating a second slurry containing the second particles onto a surface of second plies that form the stack, such that the second particles infiltrate into pores of the second plies; and stacking the first plies in the central zone and the second plies into the outer zone to form the stack in the predetermined three dimensional shape.

In another and alternative embodiment, the process further comprises drying the slurry.

In another and alternative embodiment, the process further comprises pre-coating the first plies and the second plies that form the stack with an interface coating prior to applying the first slurry and second slurry.

In another and alternative embodiment, the process further comprises pre-coating, wherein the pre-coating comprises a chemical vapor infiltration process to build up at least one deposition layer onto the ceramic fibers.

In another and alternative embodiment, the process further comprises adjusting the number of first particles located within the stack, such that the first particles and the second particles have the same volume fraction.

In another and alternative embodiment, the process further comprises adjusting the number of first particles located within the stack, such that the first particles and the second particles have the same surface area.

Other details of the process are set forth in the following detailed description and the accompanying drawings wherein like reference numerals depict like elements.

DETAILED DESCRIPTION

Figure 1:
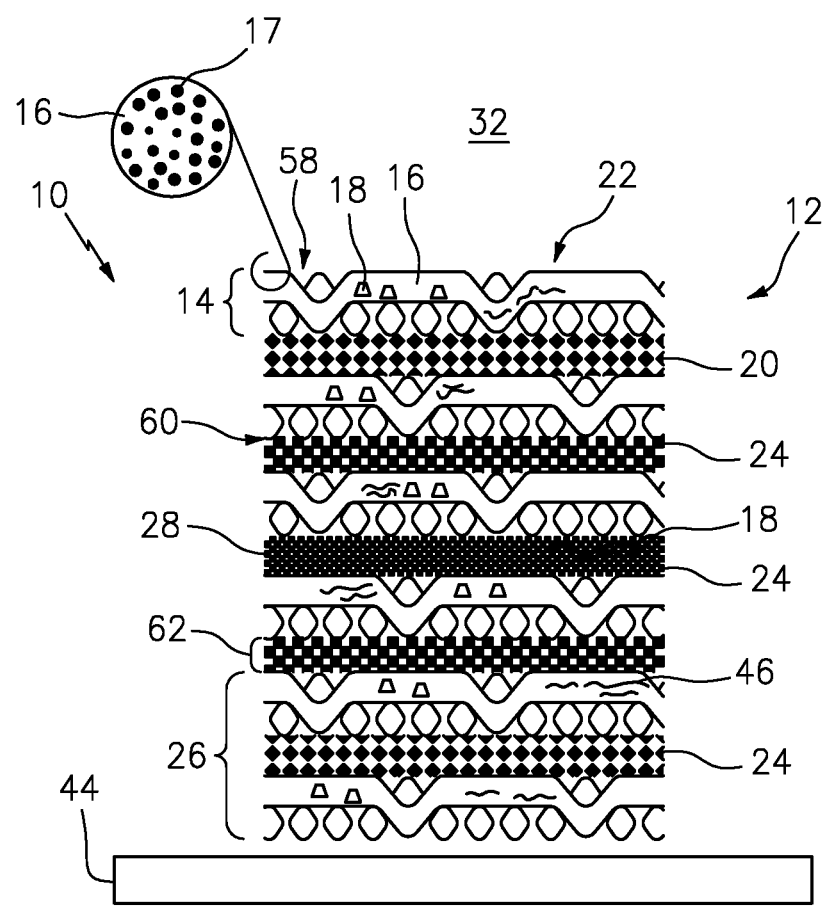
FIG. 1 is a cross section of schematic of exemplary fiber tow plies in a stack according to the disclosure.

FIG. 1 is a cross section of schematic of an exemplary a stack 10. The stack 10 can be formed as a component 12 adapted for use in a gas turbine engine. The component 12 may be a component of a high temperature mechanical system. For example, component 12 may be a seal segment, a blade, a vane, a combustion liner, or any other CMC component used within a gas turbine engine.

The stack 10 may be fabricated by first forming a ply 14 of ceramic fiber tows 16. In an exemplary embodiment, the stack 10 can include the reinforcing ceramic continuous fiber plies 14 that comprises fibers 17 arranged into tows 16 aligned into the stack 10. In an exemplary embodiment, 500 fibers 17 can form a tow 16 (or yarn). Many tows 16 are woven together to form a ply 14, 5-10 plies are 'layed up' in a stack 10 (placed in a preform or mold) to create the skeleton of a component (e.g. a turbine blade). Chemical vapor infiltration (CVI) may be used to build up one or more deposition layers 18 onto the ceramic fiber tows 16. For example, silicon carbide may be deposited onto the ceramic fiber tows 16. A slurry 20 may then be infiltrated into the stack on a surface 22 having porosity. The slurry 20 may include particles 24 of carbon and/or silicon carbide. After slurry infiltration, the plies 14 may be infiltrated with molten silicon metal. The silicon metal and carbon may form silicon carbide to create a silicon carbide matrix 26 between the ceramic fibers 16 resulting in a dense CMC component 12.

Chemical vapor infiltration is a process, in which reactant gases diffuse into an isothermal porous preformed stack 14 made of long continuous fibers 17 and form the deposition 18. Deposited material 18 is a result of chemical reaction occurring on the fibers surface 22. The infiltration of the gaseous precursor into the reinforcing ceramic continuous fiber structure (preform 14) is driven by either diffusion process or an imposed external pressure.

The deposition 18 fills the space between the fibers 17, forming composite material in which matrix is the deposited material and dispersed phase is the fibers 17 of the plies 14. Chemical Vapor Infiltration (CVI) is similar to Chemical Vapor Deposition (CVD), in which deposition forms when the reactant gases react on the outer substrate surface. The vapor reagent is supplied to the preform stack in a stream of a carrier gas (H2, Ar, He). Silicon carbide (SiC) matrix is formed from a mixture of methyltrichlorosilane (MTS) as the precursor and hydrogen as the carrier gas. Methyltrichlorosilane is decomposed according to the reaction: $CH_3Cl_3Si \rightarrow SiC+3HCl$. Carbon matrix is formed from a methane precursor ($CH_4$). The ceramic deposition is continuously growing as long as the diffusing vapor is reaching the reaction surface 22. The porosity of the material decreases as the stack 10 is filled with the formed solid ceramic deposits 18. However, in the course of the CVI process the accessibility of inner spaces 28 of the stack 10 become more difficult due to filling the vapor paths with forming the ceramic matrix 26.

Referring also to FIGS. 2A-2D, exemplary processes are disclosed. An exemplary process of forming the CMC stack 10 by weaving the SiC fiber tows 16 into plies 14 assembled into stack 10 is shown. The next step is to create a variety of slurry compositions 20, each slurry 20 contains particles 24 of a designated size, such as small particles, medium particles and large particles. The slurries 20 may possess tackifier qualities that can improve joining the plies 14 together. The particles 24 can include different aspect ratios, such as spherical shapes and fiber shapes. The next step includes the application of the different slurries to the plies outer surfaces 22. A portion of the particles 24 can infiltrate into pores of the plies 14, and a portion of the particles 24 can remain on the surface 22 of the plies 16. A drying step may occur leaving particles 24 adhered to the surface 22. In the next step the plies are joined together into the stack or lay-up of plies 10. The lay-up of plies (stack) 10 can be characterized as having an outer zone 30, that is, the portion of the stack 10 that is near an exterior 32 of the stack 10. There is a middle zone 34 proximate the outer zone 30 and between a central zone 36 and the outer zone 30. In an exemplary embodiment, it is contemplated that there are only two zones, the central zone 36 is bounded by the outer zone 30 on either side. Each zone 30, 34, 36 can be 1 to 10 plies thick. In an exemplary embodiment, the central zone may be 1 to 20 plies 14 thick, preferably 1-5 plies thick. The middle zone may be 1 to 20 plies thick, preferably 1-5 plies 14 thick. The outer zone may be 1 to 20 plies 14 thick, preferably 1-5 plies 14 thick. The thickness of each zone need not be equal and may vary depending on the application. The central zone 36 is the inner most zone in the stack 10.

The slurry 20 applied to the plies 14 in the central zone 36 can contain the small particles 38. The slurry 20 applied to the plies 14 in the middle zone 34 can contain the medium sized particles 40. The slurry 20 applied to the plies 14 in the outer zone 30 can contain large particles 42.

The next step in the process includes forming the slurry coated plies 14 into a 3 dimensional (3-D) shape. This is done by placing the lay-up of stacked plies 10 into a tool 44 (shown in FIG. 1) that will shape the stack 10 of plies 14 into the composite component 12. The tool 44 is capable of pressing the plies 14 together and forming the 3-D shape of the composite component 12. The tool 44 can have a predetermined shaped mold.

The next step of the process is to densify the materials in the plies 14 through chemical vapor infiltration. The component 12 can become rigidized and densify. The vapor infiltration process can be in 2 stages: first, an interface coating 46 can be deposited, second, the matrix phase 18 can be deposited. The interface coating is of thickness of less than 10 microns and is can be between 0.1 and 1 micron and may be composed of BN or C. The layer 18 is thicker and continues to grow until the composite reaches the desired density and may be composed of SiC or C.

In an alternative embodiment, the process can include beginning with a stack 10 of plies 14 shaped into a component 12. The stack 10 of plies 14 can be pre-coated via a process, such as interface fiber coating 46, with materials, such as boron nitride. The interface fiber coating 46 pre-coats the fiber tows 16 in the plies 14 of the stack 10. The interface coating 46 protects the fibers 17 from unwanted wear caused by the inclusion of the particles 24. The particles 24 in the slurry 20 can be hard materials that can impart damage to the plies 14 of SiC fiber tows 16. The pre-coating 46 can provide some level of protection to the fibers 17 from damage caused by pressing the slurry 20 into the plies 14, especially the slurry 20 containing hard particles 24. The stack 10 is then shaped and rigidized into a composite component 12 shape.

Figure 2A:
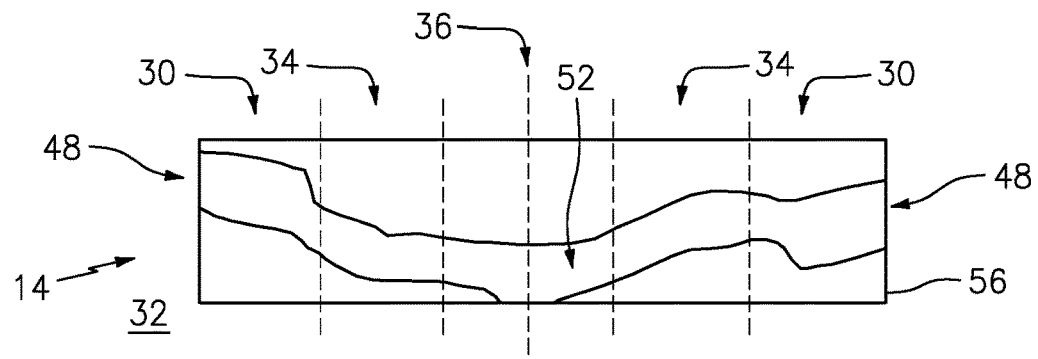
FIG. 2a-2d are a series of schematic diagrams depicting an exemplary process according to the disclosure.
Figure 2B:
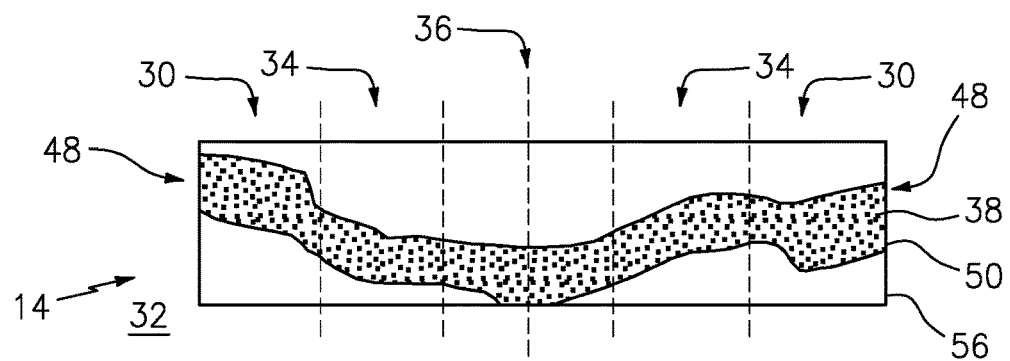
Figure 2C:
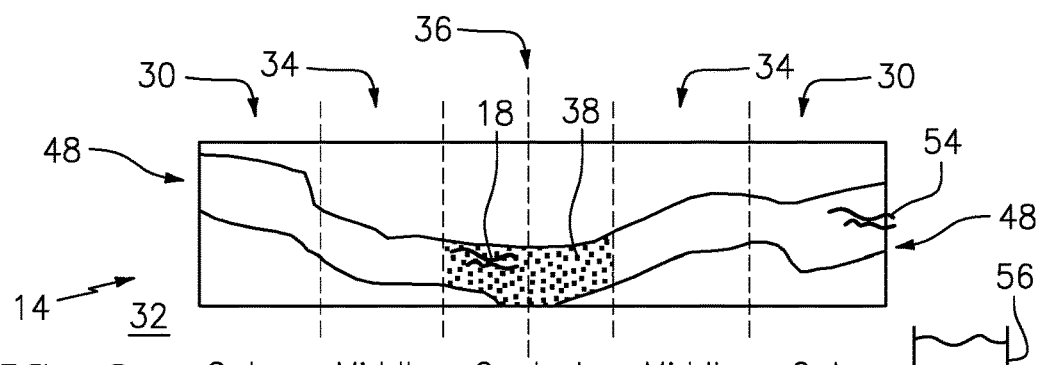
Figure 2D:
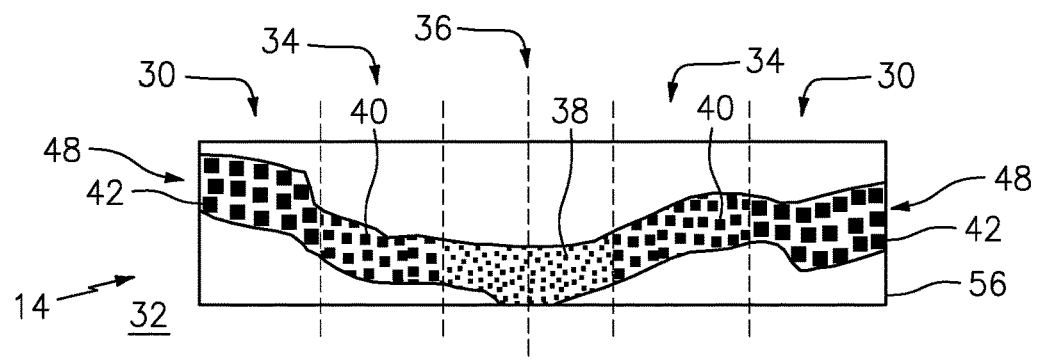

The stack 10 is infiltrated within the shaping tool 44 so that the small particles 38 can be infiltrated into the pores 48 of the plies 14 all the way to the central zone 36. The smallest particles 38 can be infiltrated into the entire stack throughout the central zone 36, middle zone 34 and outer zone 30, as seen in FIG. 2B. The small particles 38 can be part of a binder 50 that will be used with the stack 10. The binder 50 can be cured. The small particles 38 are then fixed in the pores 48 of the plies 14. The small particles 38 have the largest surface area and can range in nominal size of from about 0.5 microns to about 10 microns with a radius of about 0.25 microns to about 5 microns. In an exemplary embodiment, the small particles 38 can be from about 0.5 microns to about 5 microns. Thus, when the CVI is performed the SiC layer 18 deposition is improved due to the larger surface area available for depositing an interior 52 of the plies 14. The next step is to remove the binder 50 from the plies 14 at the middle zone 34 and the outer zone 30, while leaving the small particles in the central zone 36 as seen in FIG. 2C. A solvent can be used in an exemplary embodiment, to remove the binder 50.

Next, the process is repeated, but with the addition of the medium sized particles 40 to be packed into the middle zone 34 and outer zone 30. The medium particles 40 can range in nominal size of from about 0.5 to about 25 microns, and in another embodiment from about 10 microns to about 15 microns with a radius of about 5 microns to about 7.5 microns. In an exemplary embodiment, the medium size particles 40 can be from about 5 microns to about 10 microns. The medium sized particles 40 are then removed from the outer zone 30. The process is then repeated by packing the large particles 42 into the outer zone 30. The large particles 42 can range in nominal size of from 0.5 to about 45 microns, and in another embodiment, from about 15 microns to about 30 microns with a radius of about 7.5 microns to about 15 microns. In an exemplary embodiment, the large particles 42 can range from about 10 to about 15 microns. The result is that small particles 38 are located in the central zone 36, medium particles 40 are in the middle zone 34 and large particles 42 are in the outer zone 30. The infiltration process is performed, such as a CVI, after each step in order to coat the layer 18 and densify.

The particle loading in the central zone 36 can include X value. The particle loading in the middle zone can include 0.5X to X; and in another embodiment the middle zone can have a particle loading of 0.75X to 0.85X. The outer zone can include a particle loading of 0.25X to X, and in another embodiment 0.5X to 0.75X.

The pores 48 found in the exemplary plies 14 in a stack 10 can include an intra-tow gap 58 found between the tows 16 of fibers 17. There can be an intra-ply gap 60 found in each ply 14. There can be an inter-ply gap 62 located between each ply 14. The application of the various sized particles 24 can be tailored to create one of a constant volume particle loading in the stack 10 or a constant particle surface area within the stack 10. The constant volume loading of particles in the stack for a set number of large particles can be accomplished by adjusting the number of small particles such that each size particle, (small, medium, large) has the same volume fraction. In this approach the surface area for each of the class of particle size will vary. The constant surface area loading of particles in the stack for a set number of large particles can be accomplished by adjusting the number of smaller particles such that each size particle (small, medium, large) has the same total surface area. In this approach the volume for each of the class of particle size will vary. The predictability of the growth of the layers 18 on the particles can be better controlled by utilizing the techniques of the constant volume or constant surface area of the particles 24.

Figure 3:
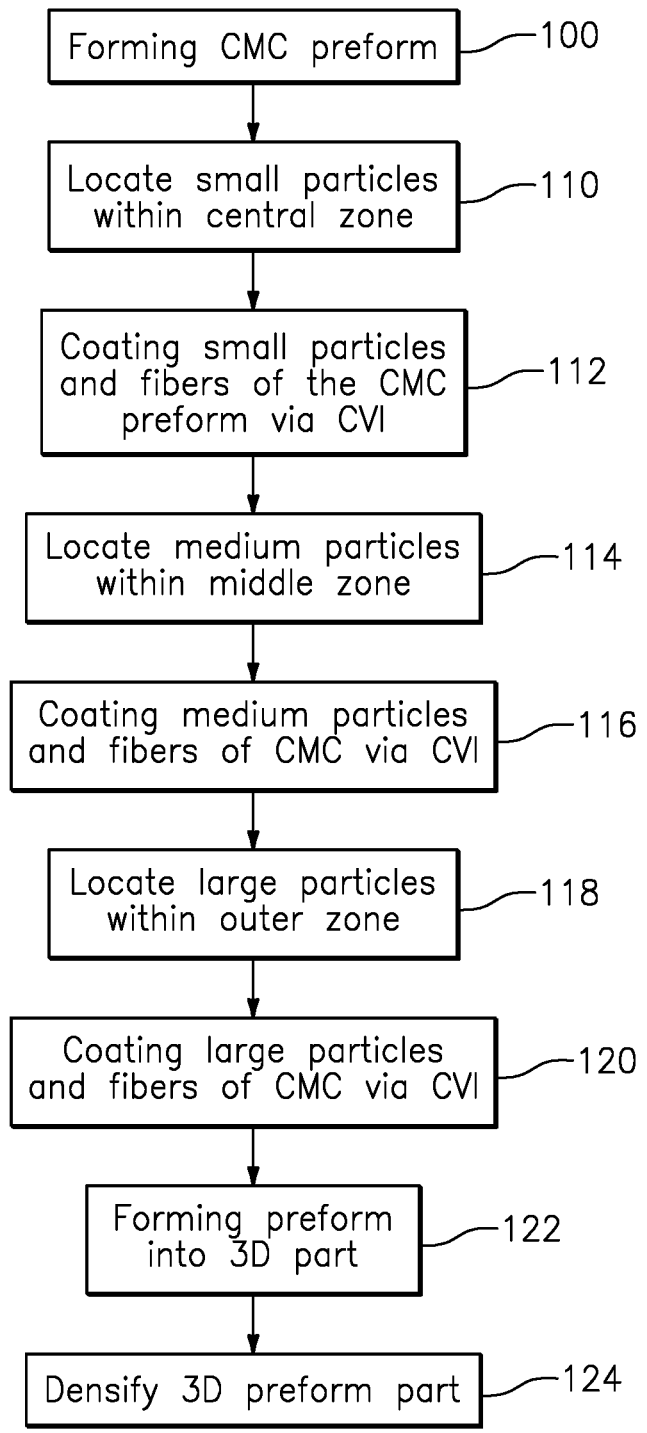
FIG. 3 is a process flow map depicting the exemplary process according to the disclosure.

With reference to FIG. 3, an exemplary process for densification of a ceramic matrix composite can be described. At step 100, the process includes forming a reinforcing ceramic continuous fiber stack 10 with plies 14 having a central zone 36 bounded by a middle zone 34 and an outer zone 30 adjacent the middle zone 34 and opposite the central zone 36. At step 110, the process includes locating the small particles 38 within the central zone 36. At step 112 the process includes coating said small particles and the ceramic fibers 17 with silicon carbide 18 through chemical vapor infiltration. At step 114 the process includes locating medium particles 40 within the middle zone 34. At step 116 the process includes coating the medium particles 40 and the ceramic fibers tows 16 with silicon carbide 18 through chemical vapor infiltration. The next step 118 includes locating large particles 42 within the outer zone 30. At 120, the step of coating the large particles 42 and the ceramic fiber tows 16 with silicon carbide 18 through chemical vapor infiltration is performed. At step 122, the exemplary process includes forming the plies 14 into a predetermined three dimensional shaped component 12. At step 124 the process includes densifying the component 12.

In another exemplary embodiment the process can include a third method that can be a combination of the first and second processes. The tows 16 of fibers 17 are woven to form plies 14. The plies 14 are joined together by particle enriched tackifier in a stack 10. The stack 10 of plies 14 are loaded into the tool 44 to be formed into a 3-D component 12 shape. The next step is to perform a CVI on the stacked plies 14 in the tool 44. The intra-tow pores 48 are filled. The stack 10 of plies 14 is rigidized. The next step is to remove the stack 10 of rigidized plies 14 from the tool 44. The small particles 38 are located within the central zone 36 by infiltrating into the stack 10 of fiber plies 14. The small particles 38 are infiltrated completely into the central zone 36, middle zone 34 and outer zone 30. To accomplish the infiltration, the rigidized plies 14 can be dipped into a liquid bath 56 containing the small particles 38, in an exemplary embodiment. Then, the small particles 38 are removed from the middle zone 34 and outer zone 30. Coating the small particles 38 is accomplished by performing a CVI, so that the infiltration materials plate out as layers 18 on the small particles 38 within the central zone 36. Then, the medium particles 40 are infiltrated into the middle zone 34 and outer zone 30. The medium particles 40 are removed from the outer zone 30. Another CVI is performed to coat the medium particles and fibers of the CMC via the CVI process. Then the large particles 42 are located within the outer zone 30 by infiltrating the outer zone 30 with large particles 42. The CVI is again run to full density.

The disclosed processes can provide benefits by producing an efficient matrix densification technique through optimizing the particles inside the preform by utilizing a hybrid slurry infiltration and CVI process.

The improved matrix densification process improves the density distribution of the densifier parts while reducing the densification duration. As a result, the component quality is improved and the production costs are reduced, since previous CVI processes take weeks or months to densify a component.

There has been provided a ceramic matrix composite densification process. While the ceramic matrix composite densification process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for densification of a ceramic matrix composite comprising:
   forming a reinforcing ceramic continuous fiber stack having a central zone bounded by a middle zone and an outer zone adjacent said middle zone opposite said central zone;
   locating small particles within said central zone;
   coating said small particles and ceramic fibers with silicon carbide through chemical vapor infiltration;
   locating medium particles within said middle zone;
   coating said medium particles and said ceramic fibers with silicon carbide through chemical vapor infiltration;
   locating large particles within said outer zone; and
   coating said large particles and said ceramic fibers with silicon carbide through chemical vapor infiltration;
   forming a preform into a predetermined three dimensional shape; and
   densifying said reinforcing ceramic continuous fiber stack.

2. The process of claim 1, wherein said reinforcing ceramic continuous fiber stack comprises fiber tows aligned into a plies, each fiber tow having a surface having pores.

3. The process of claim 2, wherein said step of locating small particles within said central zone further comprises coating said surface of the fiber tow proximate said central zone with a slurry containing said small particles.

4. The process of claim 2, wherein said step of locating medium particles within said middle zone further comprises coating said surface of the fiber tow proximate said middle zone with a slurry containing said medium particles.

5. The process of claim 2, wherein said step of locating large particles within said outer zone further comprises coating said surface of the fiber tow proximate said outer zone with a slurry containing said large particles.

6. The process of claim 2, wherein said step of densifying said stack comprises utilizing said chemical vapor infiltration to coat surfaces of said small, medium and large particles and coat surfaces of said fiber tows; and
   heating said stack.

7. The process of claim 2, further comprising:
   prior to locating said small, medium and large particles, pre-coating said tows aligned into said stack of plies by employing an interface fiber coating; and
   rigidizing said stack.

8. The process of claim 7, further comprising:
   infiltrating said small particles into said pores of said tow in said central zone, said middle zone and said outer zone by using a binder including said small particles;
   removing said binder having said small particles from said middle zone and said outer zone.

9. The process of claim 8, further comprising:
   infiltrating said medium particles into said pores of said tow in said middle zone and said outer zone by using a binder including said medium particles;
   removing said medium particles from said outer zone.

10. The process of claim 9, further comprising:
    infiltrating said large particles into said pores of said tow in said outer zone by using a binder including said large particles.

11. The process of claim 9, wherein removing said small particles and said medium particles comprises soaking said stack in a solvent for a predetermined time to dissolve said binder from said middle and outer zones respectively.

12. The process of claim 1, wherein said step of forming said stack into a predetermined three dimensional shape comprises placing said stack into a tool having a predetermined shape mold.

13. The process of claim 12, wherein said step of forming said stack into a predetermined three dimensional shape comprises pressing said stack in said tool into said predetermined shape.

14. A process for densification of a ceramic matrix composite comprising:
    forming a reinforcing ceramic continuous fiber stack having a central zone bounded by an outer zone;
    locating first particles within said central zone;
    coating said first particles and ceramic fibers with silicon carbide through chemical vapor infiltration;
    locating second particles within said outer zone;
    coating said second particles and said ceramic fibers with silicon carbide through chemical vapor infiltration;
    forming said reinforcing ceramic continuous fiber stack into a predetermined three dimensional shape; and
    densifying said reinforcing ceramic continuous fiber stack.

15. The process of claim 14, further comprising:
    coating a first slurry containing said first particles onto a surface of first plies that form said stack, such that a portion of said first particles infiltrate into pores of said first plies and a portion remain on the surface of said first plies;
    coating a second slurry containing said second particles onto a surface of second plies that form said stack, such that a portion of said second particles infiltrate into pores of said second plies and a portion remain on the surface of said second plies; and
    stacking said first plies in said central zone and said second plies into said outer zone to form the stack in said predetermined three dimensional shape.

16. The process of claim 15, further comprising:
    drying said slurry.

17. The process of claim 15, further comprising:
    pre-coating said first plies and said second plies that form said stack with an interface coating prior to applying said first slurry and second slurry.

18. The process of claim 17, further comprising:
    pre-coating comprises a chemical vapor infiltration process to build up at least one deposition layer onto the ceramic fibers.

19. A process for densification of a ceramic matrix composite comprising:
    forming a reinforcing ceramic continuous fiber stack comprising fiber tows aligned into a plies, each fiber tow having a surface having pores, said reinforcing ceramic continuous fiber stack having a central zone bounded by a middle zone and an outer zone adjacent said middle zone opposite said central zone;

pre-coating said tows by employing an interface fiber coating;

rigidizing said reinforcing ceramic continuous fiber stack;

locating small particles within said central zone by infiltrating said small particles into said pores of said tow in said central zone, said middle zone and said outer zone by using a binder including said small particles;

removing said binder having said small particles from said middle zone and said outer zone;

coating said small particles and ceramic fibers with silicon carbide through chemical vapor infiltration;

locating medium particles within said middle zone;

coating said medium particles and said ceramic fibers with silicon carbide through chemical vapor infiltration;

locating large particles within said outer zone; and coating said large particles and said ceramic fibers with silicon carbide through chemical vapor infiltration;

forming a preform into a predetermined three dimensional shape; and densifying said reinforcing ceramic continuous fiber stack.

* * * * *